United States Patent [19]
Kirsch et al.

[11] Patent Number: 5,920,854
[45] Date of Patent: Jul. 6, 1999

[54] REAL-TIME DOCUMENT COLLECTION SEARCH ENGINE WITH PHRASE INDEXING

[75] Inventors: Steven T. Kirsch, Los Altos; William I. Chang, Mountain View; Ed R. Miller, Palo Alto, all of Calif.

[73] Assignee: Infoseek Corporation, Sunnyvale, Calif.

[21] Appl. No.: 08/696,782

[22] Filed: Aug. 14, 1996

[51] Int. Cl.[6] .................................................. G06F 17/30
[52] U.S. Cl. .................... 707/3; 707/1; 707/2; 707/4; 707/5; 707/6; 707/7; 705/2
[58] Field of Search ................... 707/1, 2, 35, 8, 707/101, 202, 4, 9, 10, 103, 200, 536; 705/2; 380/25; 395/200.57, 200.3, 672, 800.3; 345/347, 507

[56] References Cited

U.S. PATENT DOCUMENTS

| | | | |
|---|---|---|---|
| 5,659,732 | 8/1997 | Kirsch | 707/5 |
| 5,668,987 | 9/1997 | Schneider | 707/3 |
| 5,715,443 | 2/1998 | Yanagihara | 707/3 |
| 5,721,897 | 2/1998 | Rubinstein | 707/2 |
| 5,757,917 | 5/1998 | Rose | 380/25 |

OTHER PUBLICATIONS

Pfeifer, Ulrich, et al.: "Searching Structured Documents with the Enhanced Retrieval Functionality of Free Wais–sf– and SFgate" Computer Networks and ISDN Systems vol. 27 (1995) pp. 1027–1036.

Turtle, Howard, et al.: "Query Evaluation: Strategies and Optimizations" Information Processing & Management vol. 31. (1995) No. 6. pp. 831–850.

Strzalkowski, Tomek: "Natural Language Information Retrieval" Information Processing & Management vol. 31, (1995) pp. 397–417.

Tomasic, Anthony, et al.: "Catching and Database Scaling in Distributed Shared–Nothing Information Retrieval Systems" 8393 Sigmod Record No. 2. (1993) Jun. 22, pp. 129–138.

*Primary Examiner*—Paul R. Lintz
*Assistant Examiner*—Diane D. Mizrahi
*Attorney, Agent, or Firm*—David E. Lovejoy

[57] ABSTRACT

A collection search system is responsive to a user query against a collection of documents to provide a search report. The collection search system includes a collection index including first predetermined single word and multiple word phrases as indexed terms occurring in the collection of documents, a linguistic parser that identifies a list of search terms from a user query, the linguistic parser identifying the list from second predetermined single words and multiple word phrases, and a search engine coupled to receive the list from the linguistic parser. The search engine operates to intersect the list with the collection index to identify a predetermined document from the collection of documents. The search engine includes an accumulator for summing a relevancy score for the predetermined document that is related to the intersection of the predetermined document with the list.

11 Claims, 4 Drawing Sheets

REAL-TIME DOCUMENT COLLECTION SEARCH ENGINE WITH PHRASE INDEXING

CROSS-REFERENCE TO RELATED APPLICATIONS

The present application is related to the following pending application Ser. No. 08/928542, assigned to the Assignee of the present Application:

1) METHOD FOR AUTOMATICALLY SELECTING COLLECTIONS TO SEARCH IN FULL TEST SEARCHES (INFS1006), filed herewith.

The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is generally related to document search engines utilizing text based queries to identify query related relevant documents and, in particular, to an enhanced document search engine providing high-speed query response against a real-time updatable, potentially distributed document collection.

2. Description of the Related Art

The volume and variety of informational content available on the World Wide Web (the "Web") is and will likely continue to increase at a rather substantial pace. This growth, combined with the highly decentralized nature of the Web, creates a substantial difficulty in locating particular informational content. Various Web-based search sites support generalized content based searching. Even when content is found through a Web document search, a further difficulty occurs in trying to evaluate the relative merit or relevance of concurrently found documents. The search for specific content based on a few key words will almost always identify documents whose individual relevance is highly variable. Thus, the sheer volume of documents available on the Web tends to undermine the usefulness of the Web in finding and making use of particular informational content.

The Web search services generally perform an incremental scan of the Web to generate various, often substantial indexes that can be later searched in response to a user's query. The generated indexes are essentially proprietary databases of document identification information; proprietary in the sense that the structure and content of unrelated index instances may vary considerably. Currently, full Web index files are easily on the order of 200 gigabytes and increasing at an average rate of about 5% per day.

Web search services typically need to support a number of specific search capabilities to be at least perceived as a useful document locator service within the Web community. These capabilities include performing relatively complete searches of all of the available Web information, providing fast user-query response times, and developing an appropriate relevance ranking of the documents identified through the index search, among others.

In order to support a relatively complete search over any collection of documents, the derived document collection index managed by a Web search service may store a list of the terms, or individual words, that occur within the indexed document collection. Words, particularly simple verbs, conjunctions and prepositions are often preemptively excluded from the term index as presumptively carrying no informationally significant weight. Various heuristics can be employed to identify other words that appear too frequently within a document collection to likely serve to contextually differentiate the various documents of the collection. As can be expected, these heuristics are often complex and difficult to implement without losing substantive information from the index. Furthermore, as these heuristics generally operate on a collection-wide basis to minimize unbalanced loss of information, a distributed database architecture for storing the document collection variously becomes prohibitively complex to implement, slow in terms of query response time and quite limited in providing global relevancy ranking.

In order to improve query response time, conventional Web search services often strive to minimize the size of their indexes. A minimum index format provides identifications of any number of documents against particular indexed terms. Thus, word terms of a client query can be matched against the collection index terms to identify documents within the collection that have at least one occurrence of the query terms. A conventional relevancy score can be based on the combined frequency of occurrence of the query terms on a per document basis. Other weighing heuristics, such as the number of times that any of the query terms occur within a document, can also be used. These relevance ranking systems typically presume that increasing occurrences of specific query terms within a document means that the document is more likely relevant and responsive to the query. A query report listing the identified documents ranked according to relevancy score is then presented to the client user.

Simple occurrence indexes as described above are, nonetheless, quite large. In general, a term occurrence index maintained in a conventional relational database management system will be approximately 30% of the total size of the entire collection.

At the expense of index size, proximity information is conventionally utilized to improve document relevancy scoring. The basic occurrence index is expanded into a proximity index by storing location-of-occurrence information with the document identifications for each of the indexed terms in a document collection. Storing the expanded term-proximity information results in the size of the index typically being on the order of 60 to 70 percent of the total size of the document collection.

The term-proximity information provides an additional basis for evaluating the relevancy of the various documents responsive to a particular client query. Conventional search engines can post-process the client query identified documents to take into account the relative proximity of the search terms in individual documents. In effect, a revised relevancy ranking of the documents is generated based on whether, and to what degree, query terms are grouped in close proximity to one another within the identified document. Again, the conventional presumption is that the closer the proximity of the terms, the more likely the document will be particularly relevant and responsive to the client query.

Various schemes can be utilized to further weight and balance the relevancy scores derived from term frequency and term proximity. While a number of such schemes are known, the schemes operate on the reasonable and necessary premise that all relevant documents need to be initially identified from the collection before a final relative relevancy score can be computed. The relative relevancy is then calculated based on the full set of query identified documents, Thus, existing search systems cannot effectively operate against a document collection index that, due perhaps to size or to support parallel access, is fragmented over multiple server systems or against multiple collection indexes that are served from multiple distributed servers.

Furthermore, to determine if the proper, consistent ranking of the full set of query identified documents produce the ranking scores conventionally they must be calculated over the full set of identified documents. Large amounts of information must therefore be pooled from the potentially multiple index servers in order to perform the aggregate relevancy scoring. Consequently, the convenience, as well as capacity and performance, potentially realized by use of distributed servers is not generally realized in the implementation of conventional search systems Another significant limitation of conventional search systems relates to the need to ensure the timeliness of the information maintained in the collection indexes. For large collections, the collection indexes need to be rebuilt to add or remove individual document-to-term relations. The process of building and rebuilding a collection index is quite time consuming. The rapid rate of document collection content changes however, requires that the indexes be updated frequently to include new index references to added or exchanged documents. Known index preparation functions and procedures are unfortunately one, if not many orders of magnitude slower than the typical rate of document collection content change. Ever larger and faster monolithic computer systems are therefore required to reduce the document collection indexing time. While computer performance continues to steadily increase, the rate of document additions and changes appears to be far greater. Furthermore, any increase in computer performance comes at a much increased cost. Thus, practical considerations have generally become limiting factors on the performance, size and assured timeliness in searching collections for query identified documents.

Consequently, there is a clear and present need for a collection search system that is scalable without loss of performance or repeatable accuracy and that can be actively maintained current substantially in real-time.

SUMMARY OF THE INVENTION

Thus, a general purpose of the present invention is to provide a fast response document collection search engine operative against real-time updatable document indexes that can be distributed over some number of collection index servers.

This is achieved by the present invention by establishing a collection search system that is responsive to a user query against a collection of documents to provide a search report. The collection search system includes a collection index including first predetermined single word and multiple word phrases as indexed terms occurring in the collection of documents, a linguistic parser that identifies a list of search terms from a user query, the linguistic parser identifying the list from second predetermined single words and multiple word phrases, and a search engine coupled to receive the list from the linguistic parser. The search engine operates to intersect the list with the collection index to identify a predetermined document from the collection of documents. The search engine includes an accumulator for summing a relevancy score for the predetermined document that is then related to the intersection of the predetermined document with the list.

An advantage of the present invention is that the search engine utilizes selective multi-word indexing to speed the search by the effective inclusion of proximity relations as part of the document index retrieval. Furthermore, multiple identifications of a document, both on the basis of single word and phrase index identifications, results in a desirable bias of the search report score towards most relevant documents.

Another advantage of the present invention is that the index database utilized by the present invention handles both word and phrase terms as a single data type, with correspondingly simplified merge and join relational database operators. Through the combined handling of both words and phrases, the present invention usually requires only a single disk access to retrieve a term list from a collection index. The index database operations needed to support term searching and combination can be effectively achieved utilizing just merge and join relational operators, further simplifying and enhancing the intrinsic speed of the index database management system.

A further advantage of the present invention is that indexing on single words and phrases allows initial search results to be scored largely independent of the characteristics of a complete document collection or a set of collections. Thus, the present invention allows for and well supports the parallel search of multiple and distributed document collection indexes. New documents can be dynamically integrated into the searchable collections through parallel extension of any search to include a real-time updatable document collection index.

Still another advantage of the present invention is that significantly time consuming operations related to phrase inferencing are performed, for the collections being served, as part of the off-line or background collection indexing procedures and, for a user query, at query time. Time and processing intensive post-processing of search results can be removed from being a serial step in the preparation of a search report.

Yet another advantage of the present invention is that advantage can be taken of capitalization and other implicit and explicit query related hints to enhance term and phrase inferencing as well as the speed and repeatability of a user search.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DETAILED DESCRIPTION OF THE INVENTION

Figure 1:
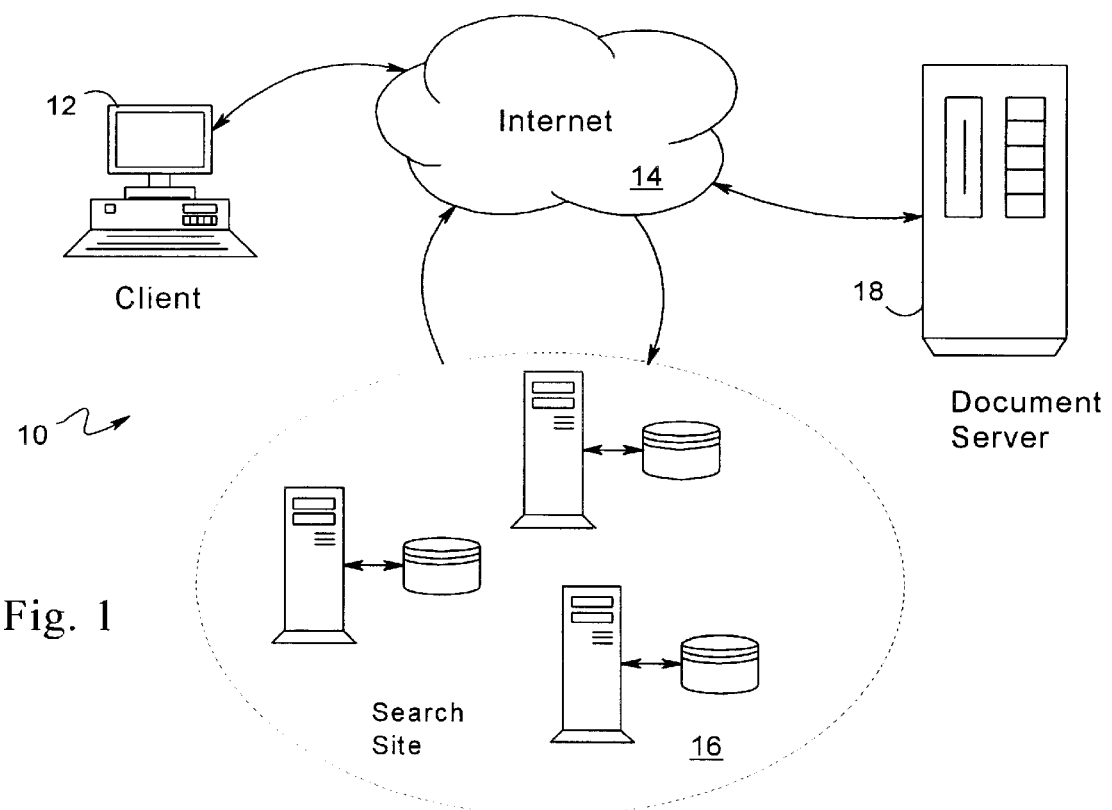
FIG. 1 provides a generalized view of an Internet based search site in relation to a querying client and document server.

A generalized networked computer system 10, consistent with the present invention, is shown in FIG. 1. A client computer system 12, capable of executing a Web browser and receiving a client-user generated client query, is coupled logically through a network, such as the Internet 14, to any number of document servers 18. In accordance with the present invention, a Web search service operates as a search site 16. The Web search service allows content based searches to be conducted against document indexes maintained at the search site 16. These indexes, in turn, reference the documents held by document servers 18.

In accordance with the present invention, the search site 16 may encompass any number of logical and physical computer systems with access to one or more individual databases. The various computer systems within the search site 16 may be interconnected through an intranet or private local-area-network to concurrently operate against the databases or database portions that are locally attached to the respective search site computer systems 16. The distribution and concurrent search of multiple databases on multiple computers within the search site 16 greatly enhances the intrinsic performance of the search site in responding to any particular client query. Concurrent search of multiple databases results in multiple potentially overlapping preliminary search reports. A directed N-way intersection of the preliminary search reports is performed to produce a search report with unique document identifications. The search scores of intersected documents from the preliminary reports are summed to yield an aggregate relevancy score for each of the documents. By including proximity based scoring of document relevancy with the initial term search for relevant documents, aggregation of the relevancy scores maintains an effectively normalized aggregation of the relevancy scores from separate preliminary searches. Consequently, a unified search report with reliable and reproducible results is directly provided by the present invention.

In addition, support for multiple databases allows the cumulative index stored by the search site 16 to be updated asynchronously with respect to the individual database indexes as previously formed and stored by the search site 16. Due to the particularly large size of these previously stored indexes, regeneration of the indexes to include new and updated index references is quite time consuming. The present invention provides for the progressive indexing of new documents within a separate real-time database that is then searchable in combination with any other document index selected in response to a client query. The relatively small size of the real-time database index allows the index to be updated at intervals that can be scheduled or asynchronous. Since the real-time database index is effectively not taken out of service when being incrementally expanded, newly indexed documents then become immediately available for reference. Thus, the present invention combines low query response time, support for distributed database index searching, and real-time currency while maintaining the ability to produce document relevancy scores that are meaningful and repeatable.

Figure 2:
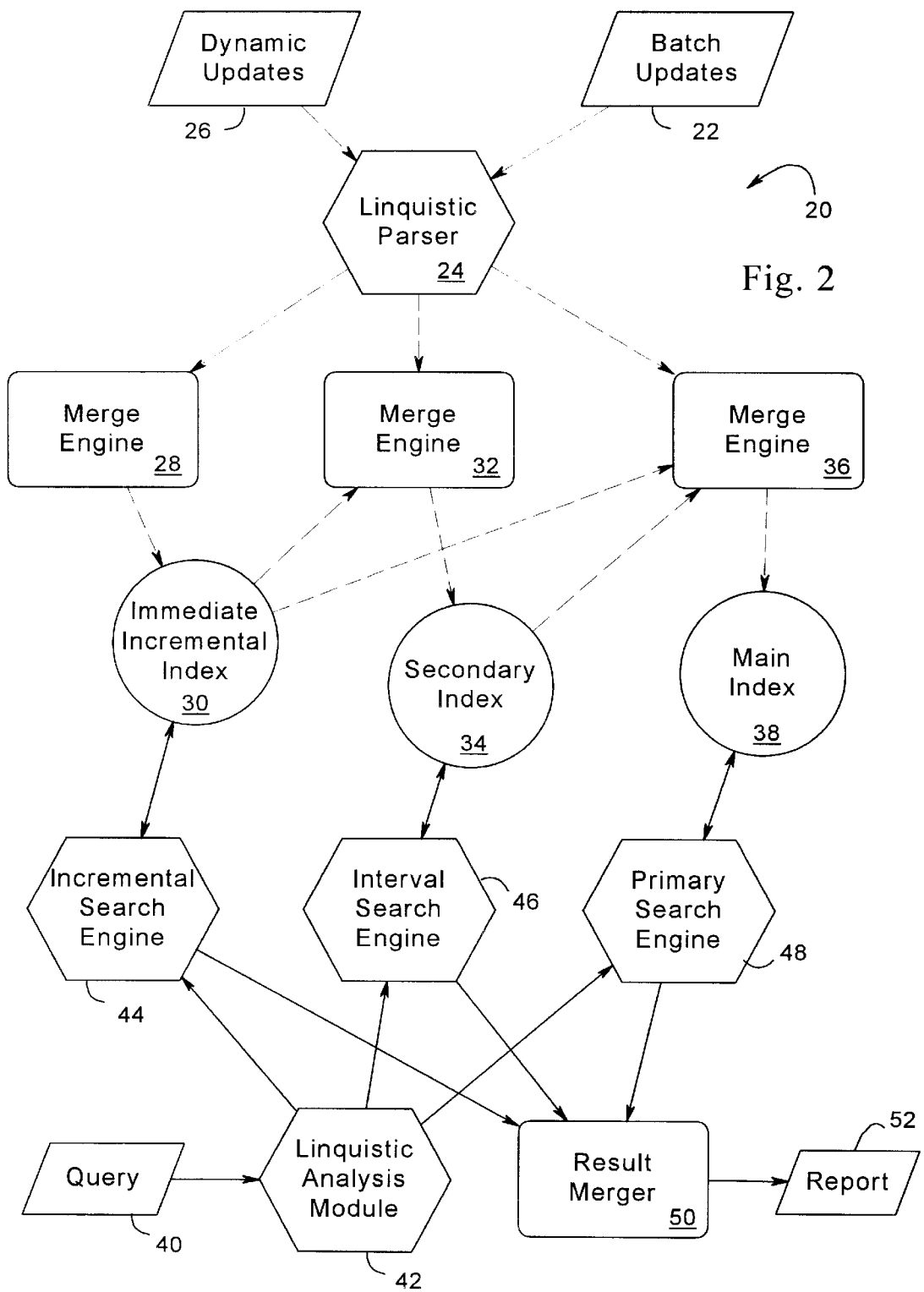
FIG. 2 provides an architectural block-diagram of a combined document index merge engine and search engine constructed in accordance with a preferred embodiment of the present invention.

The architecture 20 of the preferred index database management system (iDBMS) is shown in FIG. 2. Preferably, large sets of documents to be added to the indexer indexes of the present invention are passed as batch updates 22 to a linguistic parser 24 on some periodic basis. Typically, the batch updates 22 are collected through the operation of a Web spider that incrementally searches the Web for new and changed documents. Documents determined to be unavailable by the Web spider are noticed for deletion from the search site index.

Often documents that are identified generally on an on-going basis through a number of different mechanisms are represented dynamic updates 26. One real-time mechanism is voluntary submission of a document or document identification to the search site 16. Other mechanisms include identification through scanning articles transported through a netnews feed and as provided through any of a number of different listserv mailing groups. As with the batch updates 22, the dynamic updates 26 serves to provide documents, typically represented as Web pages, to the linguistic parser 24 for analysis.

The linguistic parser 24 preferably operates to identify characterizing information associated with each document provided as well as distinguishing terms that are likely relevant in any subsequent content based search. The document characteristics identified by the linguistic parser 24 includes numerical information, such as total number of paragraphs, lines and words, that serves to characterize the document as a whole. Non-numerical information also identified by the parser 24 as characterizing the document may include such information as the document's title, author and publication date. Preferably, a total per-document word count is kept for the entire document. The frequency of potentially relevant individual terms occurring within the document is also kept on a term-by-term basis. In addition, compound terms, which may be referred to as term phrases, are also identified from the document. Term phrase frequencies of occurrence are then determined for each of the term phrases found within the document. The document characterizing information and term list, including both simple and compound terms, are then collected by the linguistic parser 24 and provided in a standard document record format to some or all of the merge engines 28, 32, 36.

The merge engines 28, 32, 36 operate synchronously or asynchronously to incorporate received document references into any of a number of different indexes, potentially including an immediate incremental index 30, a secondary index 34 and a main index 38. The merge engines 32, 36 may also obtain document record information from predecessor indexes such as the immediate incremental index 30 and secondary index 34 in the case of the merge engine 38. The merge engines 28, 32, 36 may represent single or multiple separate instances of a single merge engine. Where a single instance is used, a designated computer system within the search site 16 may execute the merge engine 28, 32, 36 selectively with respect to any of the indexes 30, 34, 38. Alternately, the merge engines 28, 32, 36 may be separately instantiated in some combination of computers within the search site 16 so as to permit potentially concurrent yet separate updating of the indexes 30, 34, 38.

The indexes 30, 34, 38 are preferably kept as separate databases potentially distributed for concurrent access on the computers within the search site 16. The immediate incremental index 30 preferably exists as a repository for document records derived from documents obtained through the dynamic updates 26. The immediate incremental index of 30 is preferably maintained in a high access-speed store, such as the main memory of a computer system within the search site 16.

Merge engine 28 processes each new document record to immediately update the immediate incremental index 30. Although this index 30 may grow to tens if not hundreds of megabytes in size, maintaining the index 30 in-memory allows index regenerations to include the term references provided by the term list of each new document record without denying or significantly delaying query access to the immediate incremental index 30. The merge engine operation of incorporating a document record into the immediate incremental index 30 results in the identified document then being immediately searchable. Although the latency between presentation of a dynamic update document to the linguistic parser 24 and the corresponding regeneration of the immediate incremental index 30 is not necessarily definite, the present invention preferentially operates to minimize the latency depending on the availability of the linguistic parser 24, merge engine 28 and immediate incremental index 30. In the context of the present invention, the resulting latency is sufficiently minimal to deem the updates of the immediate incremental index 30 as occurring in real-time.

The document records, effectively as stored by the immediate incremental index 30, can be periodically migrated to the secondary and main indexes 34, 38. The merge engines 32, 36 obtain document record information from the immediate incremental index 30 potentially in combination with document records obtained ultimately through batch updates 22 for inclusion in the secondary and main indexes 34, 38. The secondary index 34 may be a separate iDBMS database stored by another distributed database server within the search site 16 relative to either or both the immediate incremental index 30 and main index 38. The secondary index 34 may be operated as a staging index for document records that are to be ultimately transferred to the main index 38. Alternately, the secondary index 34 may be operated as a substantial peer to the main index 38. Secondary index 34 and main index 38 may also be delineated as separate indexes distinguished by document categories. Thus, depending on document characteristics identified in the document records as either obtained from the immediate incremental index 30 or linguistic parser 24, specific document records may be migrated to either the merge engine 32 or merge engine 36 for eventual inclusion in either the secondary or main index 34, 38.

Where the rate of growth of the immediate incremental index 30 is too great to otherwise maintain efficient utilization of the index 30, document records may be periodically staged through the merge engine 32 to the secondary index 34. In this scenario, multiple batched sets of document records from the immediate incremental index 30 can be successively merged into the secondary index 34. At the same time, concurrently queued document records obtained from the batch updates 22 are also preferentially merged into the secondary index 34.

Once the secondary index 34 reaches a certain size threshold, or preferably on a periodic basis, the document records represented by the secondary index 34 are merged through the merge engine 36 into the main index 38. Some advantage can be obtained by merging the secondary index directly into the main index 38 on a term-by-term, or term phase basis. The advantage, mostly in terms of time, minimizes the scope of the index regeneration required before the main index 38 can be placed back in service. Indeed, the main index 38 may not need to be truly taken out of service pending the completion of the merge of document records from the secondary index 34. Proper utilization of transactions in the operation of the iDBMS can preclude unnecessary duplicate document identifications from being included in any search report prepared concurrent with an index regeneration. Thus, even during the migration of document records among the indexes 30, 34, 38, each index continues to authoritatively source their own unique document records Consequently, only a performance penalty in terms of speed of response to a client query is transiently encountered whenever document records are being migrated between the indexes 30, 34, 38.

An alternate scenario involving the use of the secondary index 34 treats the index 34 as a peer or terminal repository for document records. As before, the immediate incremental index 30 can be utilized to index documents in real-time through the dynamic updates 26. Document records obtained through the batch updates 22, based on document characteristics identified by the linguistic parser 24 or to balance the size of the entries in the multiple peer indexes, can be selectively directed to either the merge engine 32 or merge engine 36. Document records from the immediate incremental index 30 can be selectively transferred to the merge engines 32, 36, again based on individual document or index characteristics. The merge engines 32, 36 are then responsible for regenerating the indexes maintained on the secondary index 34 and main index 38, respectively. Indeed, any number of merge engines 32, 36 may be employed at the search site 16 to support a generally like number of indexes 34, 38 in a highly distributed computing environment. Preferably, each secondary index 34 and main index 38 is supported by and searched from an independent computer system within the search site 16.

The two above-described scenarios can also be used in conjunction with one another. That is, any number of intermediate migration index stages can be employed in the migration of document records from the linguistic parser 24 through any combination of merge engines 28, 32, 36 and immediate incremental indexes 30 and secondary staging indexes 34 for being included within a terminal or peer-stage index 34, 38.

Document record deletions and modifications are handled somewhat differently in respect to the addition of document records as described above. When a document is determined by a Web spider to be no longer available on the Web, special document record entries in the batch updates 22 are directed by the linguistic parser 24 to the iDBMS managing the indexes 30, 34, 38 to, in effect, invalidate the corresponding document record. Preferably, document references then existing in the index are marked as invalid or deleted. Where the linguistic parser 24 determines that a modified version of a existing indexed document is included in either the batch or dynamic updates 22, 26, the linguistic parser 24 prepares a new document record specific to the modified document while directing the iDBMS to invalidate or the prior existing document record. Consequently, inappropriate and incorrect document records are continuously purged from the indexes 30, 34, 38 as new and updated document records are added.

The indexes 30, 34, 38 exist as a common element participating in the document record collection indexing and client query and search portions of the architecture 20. The client query and search proceeds from a client query 40 that is submitted to a linguistic analysis module 42. This linguistic analysis module is similar to the linguistic parser 24. The main difference between the linguistic analysis module 42 and linguistic parser 24 is that the module 42 is primarily directed toward identifying appropriate search terms and term phases from a client query, whereas the linguistic parser 24 is used to parse entire documents and produce document records.

The linguistic analysis module 42 preferably filters the client query 40 to identify both single terms and term and term phrases that are most likely to represent the content of the client query 40. The resulting query list, potentially including both single and compound terms, is then delivered to all or some subsets of query search engines 44, 46, 48 within the architecture 20. Preferably, a separate search engine 44, 46, 48 is provided for each of the indexes 30, 34, 38. Thus, parallel searches can be performed on the indexes 30, 34, 38 independent of whether the indexes are only used transiently in the migration of document records to a final index 38 or to some number of peer indexes 34, 38. The search engines 44, 46, 48 may share a common implementation at least with regard to the secondary and main indexes 34, 38. The incremental search engine 44 may differ in regard to the preferred us of the primary memory storage medium immediate incremental index 30. Thus, the incremental search engine 44 preferably performs a completely in-memory search of the immediate incremental index 30.

Each of the search engines 44, 46, 48 produce preliminary or partial search reports that are combined by a result merger unit 50 to produce a final report 52. Each preliminary search report preferably contains a list of query selected term and term phrases, document identifiers where the listed terms occur, and an initial relevancy score for each listed term. Preferably, the document identifiers are uniquely assigned to the document records as they are produced by the linguistic parser 24. The initial relevancy scores are preferably based on the number of occurrences of a listed term within a document identified by a particular document identifier.

The result merger unit 50 implements an N-way intersection of the document identifiers (or IDs) specified in the preliminary search reports generated by each of the search engines 44, 46, 48. Intersected document IDs are unified by the result merger unit 50 to record a single instance of each identified document ID in the report 52 on a term-by-term basis. A document relevancy score derived in parallel from the preliminary relevancy scores determined by each of the search engines 44, 46, 48 for that particular document ID. The resulting intersected list of document IDs is then ranked based on respective relevancy scores and presented as the report 52.

Figure 3:
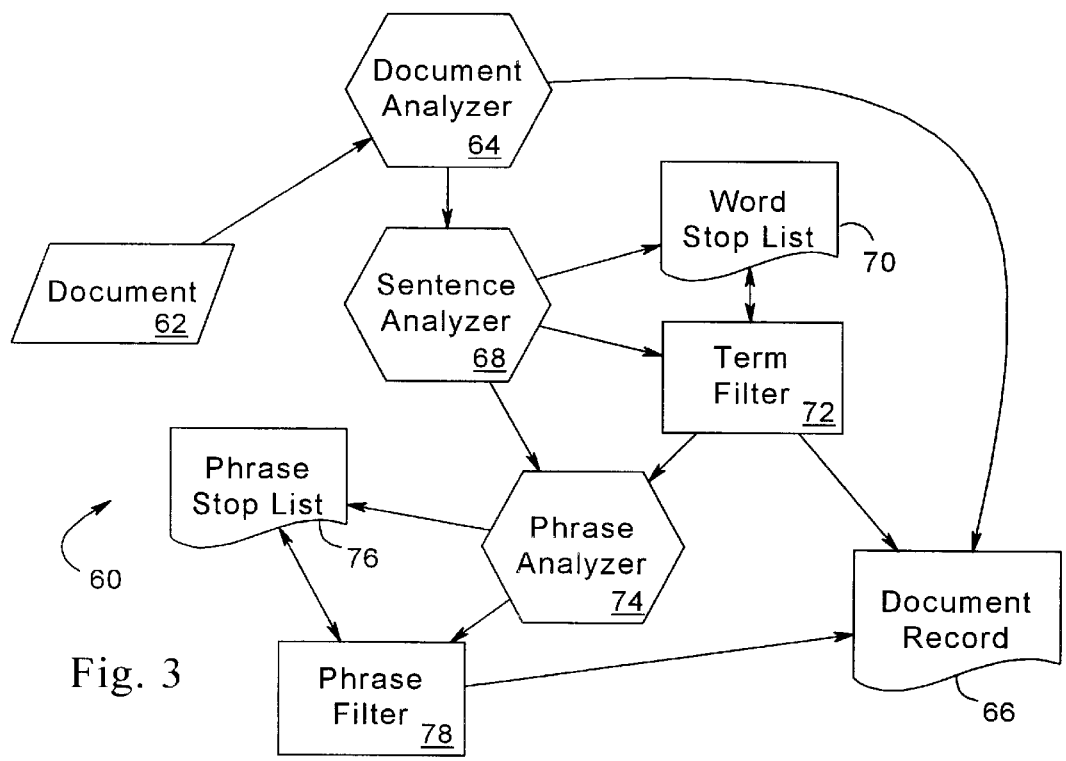
FIG. 3 is a flow diagram illustrating the process of creating a document record suitable for inclusion in a document search index.

A preferred embodiment of the linguistic parser 24 is shown in FIG. 3 as the parser system 60. In operation, the system 60 receives a series of documents 62 that are sequentially provided to a document analyzer 64. Execution of the document analyzer 64 by a computer within the search site 16 serves to collect certain information regarding a particular document 62 for storage in a document record 66. This information preferably includes at least the word count of the document 62 as well as characterizing information such as the title, author, publication date, and publication source to the extent identifiable from a document 62.

The document analyzer 64 also includes a lexical analysis routine sufficient to identify separate sequences of words from the document that reasonably represent individual sentences. The document analyzer 64 is sensitive to selected occurrences of capitalization and punctuation that can be utilized as hints in delineating individual sentences within the document 62. The sequence of sentences identified by the document analyzer 64 are successively passed to a sentence analyzer 68 for term identification. The sentence analyzer 68 identifies individual words based primarily on space separators, though potentially on selected punctuation. For example, the document analyzer 64 will identify most abbreviations with period separators as not necessarily designating the end of a word or sentence. An abbreviation such as D.O.E. will be recognized as an abbreviation for DOE and, based on spacing and capitalization of the following word, may be selectively determined to include a sentence terminator . The sentence analyzer 68, in identifying simple terms, ignores selected punctuation, such as periods and semicolons, to identify individual words. Hyphenated words in particular are further analyzed to determine whether the hyphen is either hard or soft. If soft, the hyphen is ignored and the two word parts are concatenated. Where the hyphen is hard, both the hyphenated word and the separate word parts are identified as potential terms.

The simple terms identified by the sentence analyzer 68 are provided to a term filter 72 for relevance screening. A word stop list 70 is utilized by the term filter 72 to eliminate terms that do not or are unlikely to carry contextual significance. In general, conjunctions and passive verb forms are preferably included in the word stop list 70. Simple titles such as Mr. and Mrs. and other frequently used or encountered terms are also included in the stop list 70. The actual construction of the stop list 70 is empirical, though generally related to the uniformness of the document length normalized frequency of occurrence of terms within documents processed through the system 60. Preferably, the sentence analyzer 68, in identifying terms, monitors this normalized frequency of occurrence. Where this frequency of occurrence exceeds some threshold over some set of documents, the term can be added dynamically to the word stop list 70. Subsequent occurrences of too frequently encountered terms are then effectively ignored. In a preferred embodiment of the present invention, the frequency control is set at 40,000 occurrences. Thus, the effective filtering performance of the term filter 72 may be dynamically improved to focus more on terms likely to carry contextual significance.

The terms passed by the term filter 72 are recorded in a term list that is part of the document record 66. Preferably, a cumulative number of occurrences of each term, the word count of the document and the document ID that uniquely identifies the document 62 are stored in the document record 66.

The sentence delimited sets of terms identified by the sentence analyzer 68 are also provided to a phrase analyzer 74. Individual terms that are filtered out of the same sentence by the term filer 72 are also identified to the phrase analyzer 74. Based on this information, the phrase analyzer 74 identifies two-term phrases exclusive of any intervening word stop list 70 terms. The phrase analyzer 74 is also sensitive to punctuation internal to each sentence identified by the sentence analyzer 68. Specifically, phrases that span specific punctuation, including commas, semicolons, and mdashes, are removed from further consideration as phrases. The remaining identified phrases are passed to the phrase filter 78. A phrase stop list 76 is utilized by the phrase filter 78 to eliminate phrases that provide little or no substantive context. Various pronoun and verb phrases and common prepositional phrases can be empirically identified and included in the phrase stop list 76. For example, verb phrases such as "to be", if not eliminated indirectly by the term filter 72 can be eliminated by the phrase filter 78. Pronoun phrases are handled in a similar manner. Prepositional phrases such as "on the other hand" would be reduced by the term filter 72 to common essentially context free short phrases. Such phrases can be empirically identified and listed in the phrase stop list 76. That is, the phrase "on the other hand" is effectively reduced to "other hand" by the term filter 72. The resulting phrase can be empirically determined to be unlikely to carry any contextual weight. Consequently, the phrase "other hand" would preferably be included within the phrase stop list 76.

The contextually significant phrases thus identified by the phrase filter 78 are then treated as single terms for purposes of recording within the document record 66. Each term phrase is stored with an accounting of the number of occurrences of the phrase within a document 62, the word count of the document 62, and the document identifier for the document 62.

While the present invention preferably prepares document records 66 that store information about only single word terms and two word term phrases, additional term phrases of any particular length could be also recorded. While the recording of two word phrases substantially increases the performance of the present invention over prior art systems, the additional complexity of also analyzing and recording three or more word phrases is not thought to provide a sufficient performance gain to outweigh the complexity of implementation, and, particularly, the additional storage size of the document records 66. Indexing two word term phrases increases the size of the generated index to about 75% of the size of the documents indexed. However, the search speed of processing multiple word query phrases is increased by about two orders of magnitude.

Document records 66 produced by a parser system 60 are then passed or queued for subsequent transfer to the merge engines 28, 32, 36. Each document record 66 is processed by a merge engine 28, 32, 36 preferably both as to form and substance before being intersected with a respective index 30, 34, 38. The preferred form of a processed document record is of the form:

--- term ID: (document ID; score), (document ID; score), . . .
term ID: (document ID; score), (document ID; score), . . .
 . . . .
term ID: (document ID; score), (document ID; score), . . .

---

The term ID represents an encoded value that may, but not necessarily must correspond to a unique term or term phrase. The document ID is also an encoded identifier, but one that is unique to a particular document. Finally, the score associated with each document ID represents the normalized term frequency of the term identified by the term ID within the document identified by the document ID. The normalized term frequency is derived from the term count of the term or term phrase in the document normalized to a standardized document word length.

Once a merge engine 28, 32, 36 has processed the document record 66, the resulting term record is integrated into a corresponding index 30, 34, 48. Preferably the term ID is utilized as a primary key by the iDBMS to maintain an ordered collection of document records within the indexes 30, 34, 38. Where a term ID is pre-existing in an index, the existing and new lists of document ID and score pairings are merged New pairings of documents IDs and scores are added to the existing list. Existing pairings are maintained. At this time, pairings with an invalid document ID can be completely removed. Consequently, the resulting regenerated indexes 30, 34, 38 each contain a set of term ID records with each record providing one or more document identification coupled with a respective and an effectively pre-weighted relevancy score.

Figure 4:
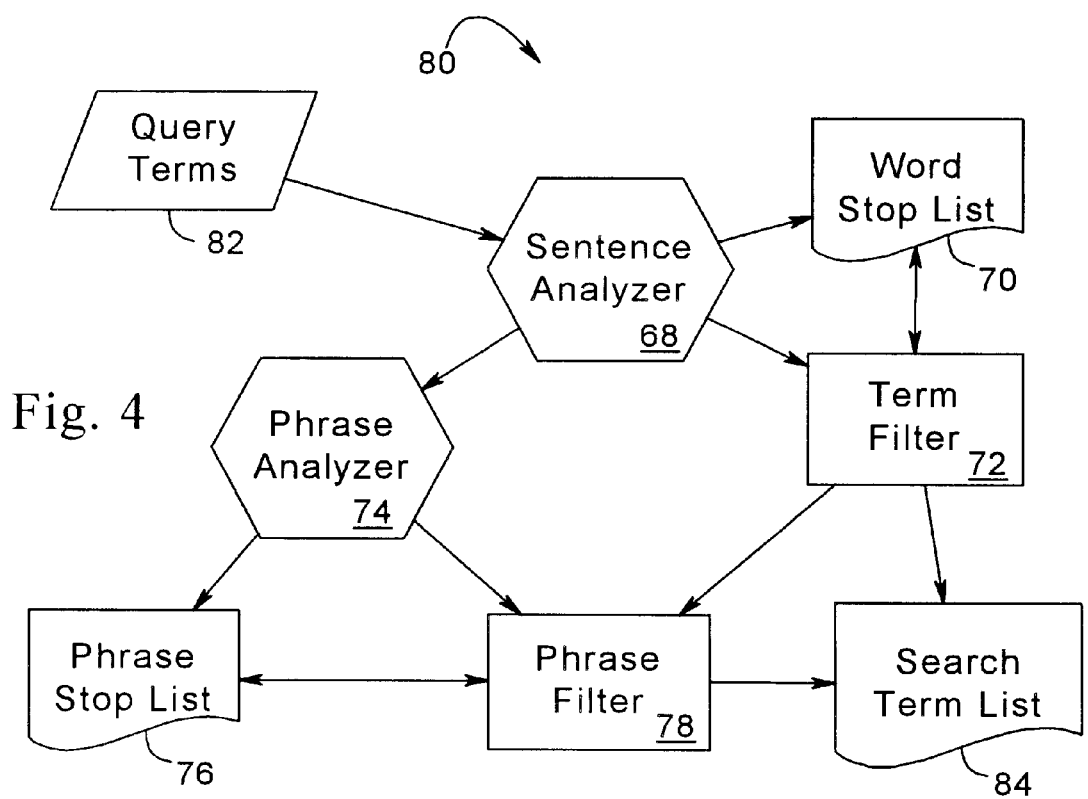
FIG. 4 provides a flow diagram of a process of generating a search term list from a user query in accordance with a preferred embodiment of the present invention.

Considering now the processing of a client query 40, reference is made to the linguistics analysis system 80 shown in FIG. 4. The system 80 corresponds to the linguistic analysis module 42 of FIG. 2. Client query terms 82 are first passed to a sentence analyzer 68 for syntactic analysis. As before, acronyms and abbreviations are placed in normalized forms by the sentence analyzer 68. Other punctuation within the provided query terms 82 is examined and generally normalized or deleted. That is, query terms 82 are typically presented as a sequence of key words, or as a sentence fragment. The query terms 82 can also possibly form multiple sentences that are descriptive of the search requested by the client 12. In either event, the sentence analyzer 68 appropriately identifies potential simple terms that are passed to term filter 72. After qualification by the word stop list 70, any remaining simple terms are passed to a search term list 84.

The set or sets of potential terms are also passed to the phrase analyzer 74. In combination with the phrase filter 78 and phrase stop list 76, any qualifying term phrases are identified and passed to the search term list 84.

Figure 5:
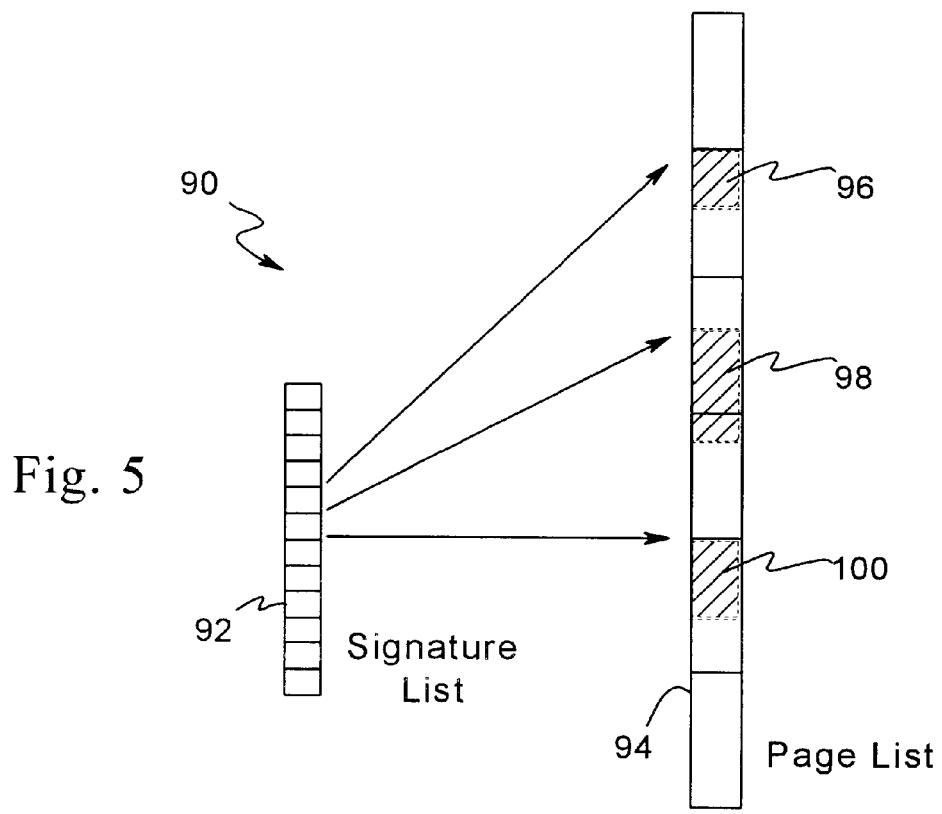
FIG. 5 is an illustration of the relationship between a signature list utilized to identify terms and a page list utilized to store term entries.

The search term list 84 is then provided to at lease one of the search engines 44, 46, 48 for processing. In accordance with the present invention, each of the terms and term phrases presented in the search term list 84 are first converted to term IDs. This conversion is performed by the search engine 44, 46, 48 against a respective in-memory hash table containing the term IDs for a corresponding index 30, 34, 38. As represented in FIG. 5, each term ID corresponds to a hash value in a hash table 92, also identified as a signature list. In the preferred embodiment of the present invention, both simple and complex terms are reduced through excess bit elimination to a unique value that is then padded or trimmed to 12 bytes in length. Although reverse hash look-ups based on term IDs may not be entirely unique, in practice compression of all terms to 12 byte values results in the generation of near perfect signatures. Each storage location within the signature list 92 stores the 12 byte hash signature, a four byte page list offset value, a page list record length stored as a two byte binary value, and a two byte page list identification value.

While the signature list 92 is preferably maintained in memory by the corresponding search engine 44, 46, 48, the corresponding index page lists 94 are generally maintained in high speed secondary storage. Each signature list entry stores a logical page list block count that identifies the page list block that contains at least the beginning of a term ID record. The four byte page table value, when combined with a standard network defined 8 Kbyte page block size defines a four gigabyte page list address space. The additional two byte value provided by the page list ID permits upwards of 65,000 page lists 94 to be referenced from a single signature list 92. Thus, the present invention easily provides for index sizes in excess of $5 \times 10^{33}$ bytes per search computer.

The page list offset value identifies a unique page list block that contains the term ID records that corresponds to the signature list entry. Typically, a term ID record 96 will be aligned to the page list block boundary and have a length of less than the page block size. Where the term ID record is sufficiently short additional term ID records may be stored within or beginning on the same page block as another term ID record. This allows efficient use of the storage space represented by the page list 94. Furthermore, by selection of a page list block size that is equal to or less than the applicable computer secondary storage read data block size, an unaligned term ID record 98 will still be fetched substantially if not completely, in its entirety by the reading of the aligned page block. Once in memory, the term ID records within the page block can be scanned sequentially to locate the desired term ID record. The page list 94 is preferably physically sorted by the primary key term ID value. Consequently, a linear in-memory search down a page block is all that is required to locate a specific term ID record that is guaranteed to at least start in a single identified page list block.

Where a term ID record 98 is of substantial length, an overlap into a subsequent page block may be allowed.

Preferably though, a small portion at the end of a page block is left unused rather that to force a page block overlap. Thus, a term ID record 100 may be preferentially aligned with the beginning of the next page block.

Where a term ID record falls entirely within a page block, only a single secondary storage read operation is required to retrieve the entire term ID record. A second read operation, although likely cached at least by the secondary mass storage device, may be required to retrieve the portion of a term ID record that overlaps into a subsequent page list block. By strongly preferring to align a term ID record with the beginning of a page list block, and then to store the term ID record fully within a single page list block, a term ID record look-up can be performed in a single mass storage read operation. By keeping the number of page block overlaps to a minimum, the preponderance of term ID look-ups will require only the single read operations. Long term ID records, even where overlapping multiple page list blocks, are however fully supported. Thus, the efficiency and flexibility of term ID look-ups is maximized by the present invention.

Figure 6:
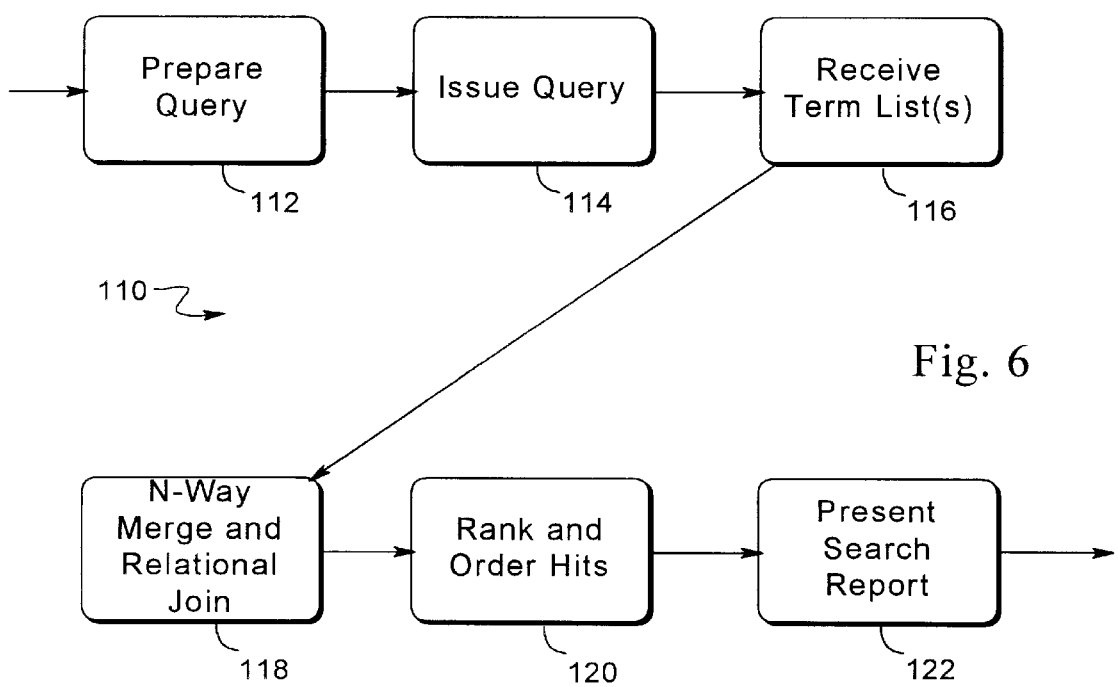
FIG. 6 provides a flow diagram illustrating the operation of the present invention in connection with both local and distributed database search engines.

Referring now to FIG. 6, the process 110 of generating a final search report is shown. As described above, a client query is first prepared 12 through the linguistic analysis system 80. The resulting search term list 84 is then passed 114 to an appropriate search engine 44, 46, 48. The term ID records are retrieved by the search engines 44, 46, 48 initially as distinct parallel preliminary term lists 116. The result merger unit 50 then operates on the term lists to perform an N-way merge and relational join 118 to form a single term list. The N-way merge creates a list of unique document IDs and their corresponding relevancy scores. Where multiple search engines identify common documents that contain multiple different search terms, a unique instance of the document ID is maintained with a cumulative value of the relevancy scores. Consequently, the N-way merge and relational join 118 yields a single list of documents IDs with cumulative relevancy scores that can then be ranked and ordered 120 by the result merger unit 50. A search report 52 is then formatted and presented 122 to the client 12.

Thus, a system providing for the real-time generation and high-performance searching of document indexes has been described. While the present invention has been described particularly with reference to searches conducted against Internet accessible search sites for publicly available documents, the present invention is equally applicable to both intranet and proprietary network document indexing and searching.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

We claim:

1. A collection search system responsive to a user query against a collection of documents to provide a search report, said collection search system comprising:

a) a collection index including first predetermined single words and first predetermined multiple word phrases as respectively indexed terms occurring in said collection of documents, said first predetermined multiple word phrases including occurrences of said first predetermined single words;

b) a linguistic parser that identifies a list of search terms from a user query, said linguistic parser identifying said list from second predetermined single words and second predetermined multiple word phrases; and c) a search engine coupled to receive said list from said linguistic parser, said search engine intersecting said list with said collection index to identify a predetermined document from said collection of documents, said search engine including an accumulator for summing, for said predetermined document, a relevancy score related to the intersection of the indexed terms of said predetermined document with the search terms of said list, whereby said first predetermined single words of said predetermined document may contribute multiply to said accumulated relevancy score for said predetermined document.

2. The collection search system of claim 1 wherein said collection is fractionally stored in a plurality of distributed servers.

3. The collection search system of claim 1 wherein said linguistic parser provides for eliding predetermined punctuation marks and stop list words from said user query while preserving word order, wherein said first predetermined multiple word phrases correspond to word phrases occurring in said collection subject to eliding of said predetermined punctuation marks and stop list words while preserving word order terms, and wherein said collection search engine accumulates said relevancy score for each intersection of said respectively indexed terms and each of the search terms of said list.

4. A search system, operative against a plurality of collections of documents as stored by a plurality of collection servers, wherein said search system provides for the generation of a search report in response to a search query, said search system comprising:

a) a plurality of indexes storing predetermined informational terms in correspondence with the documents of said plurality of collections, said predetermined informational terms being selected subject to the exclusion of any term included in a list of informational terms;

b) a query parser that derives a set of query terms from said search query, said set of query terms being selected subject to the exclusion of any term included in said list of informational terms; and c) a search engine that calculates the intersection between said predetermined informational terms for each of said plurality of indexes and said set of query terms to provide a document respective normalized score representation for each of the documents of each of said plurality of collections, said search engine evaluating said document respective normalized score representations to produce a ranked search report in response to said search query.

5. A search system providing for the evaluation of a search query against an indexed collection of documents, said search system comprising:

a) a first index part indexing word document terms;

b) a second index part indexing phrase document terms; and c) a query processor to determine the intersection of a query, represented as a combination of word query terms and phrase query terms, with said first and second index parts, said query processor providing a ranking score for a predetermined document that corresponds to the number of query term intersections with said word and document terms.

6. The search system of claim 5 wherein said phrase document terms include proximity related single word terms, and wherein phrase document terms exclude a predetermined set of words.

7. A collection search system that is responsive to a query text provided in relation to a collection of documents and that provides a responsive search report, said collection search system comprising:

a) a collection index that includes a first list of word-terms with corresponding data storing location information sufficient to identify an occurrence location within a document of said collection, said first list of word-terms including both single words and multiple word phrases, wherein the multiple word phrases of said first list are word sequences that occur in said collection subject to the exclusion of a predetermined set of words, and wherein the words of the multiple word phrases of said first list are also included in said first list as single word word-terms;

b) a parser coupled to receive said query text and responsively provide a second list of word-terms from said query text, wherein said second list includes both single words and multiple word phrases, wherein the multiple word phrases of said second list are word sequences that occur in said query text subject to the exclusion of said predetermined set of words; and c) a search engine coupled to receive said second list from said parser, said search engine intersecting said second list with said collection index to identify a predetermined document from said collection of documents, said search engine including an accumulator for summing, for said predetermined document, a relevancy score determined by the intersection of the word-terms of said first list corresponding to said predetermined document with the word-terms of said second list, whereby said relevancy score is weighted additionally by the occurrence of single words in both single word word-terms and multiple word phrase word-terms.

8. The collection search system of claim 7 wherein predetermined multiple word phrases of said first list are terminally delimited by an occurrence of any element of a predetermined set of stop-terms.

9. The collection system of claim 8 wherein said multiple word phrases are sequences of two words.

10. The collection system of claim 9 wherein a predetermined number of documents of said collection, determined by the relative ranking of said collection documents based on said relevancy scores, are provided as said responsive search report.

11. The collection system of claim 7, 8, 9, or 10 wherein said parser performs a minimal linguistic analysis sufficient to determine the single words and multiple word phrases to include in said second list of word-terms.

* * * * *